Patented Feb. 28, 1933

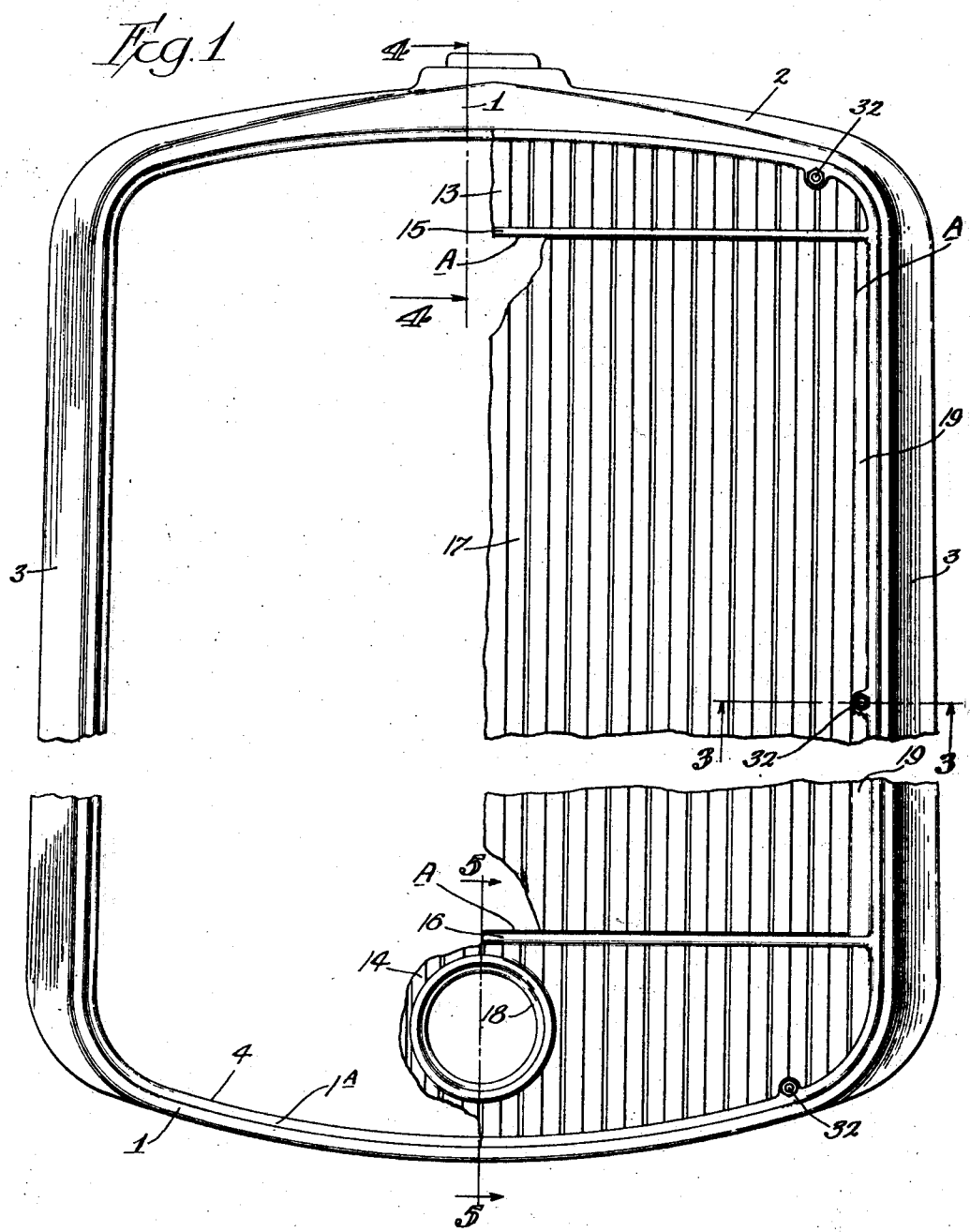

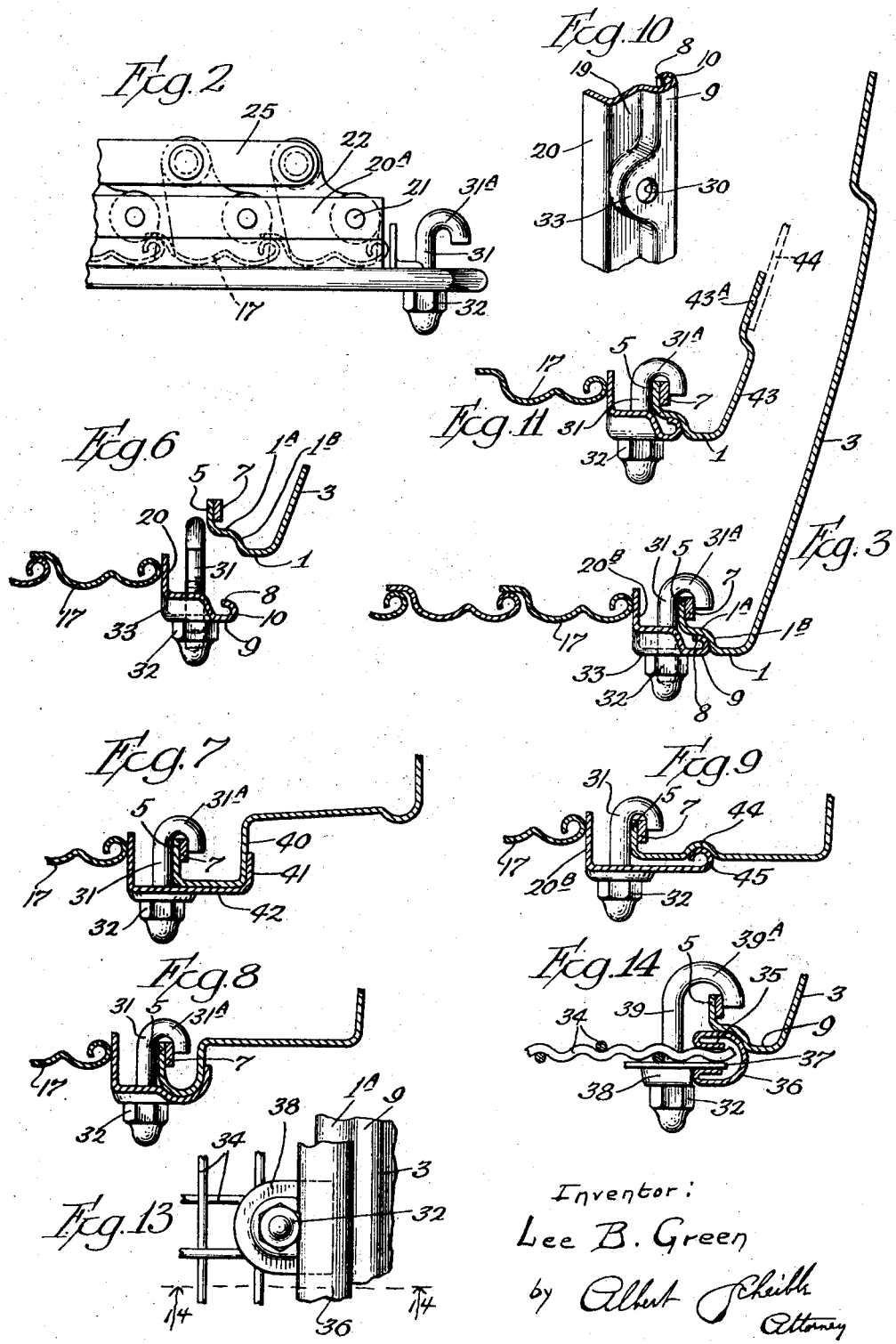

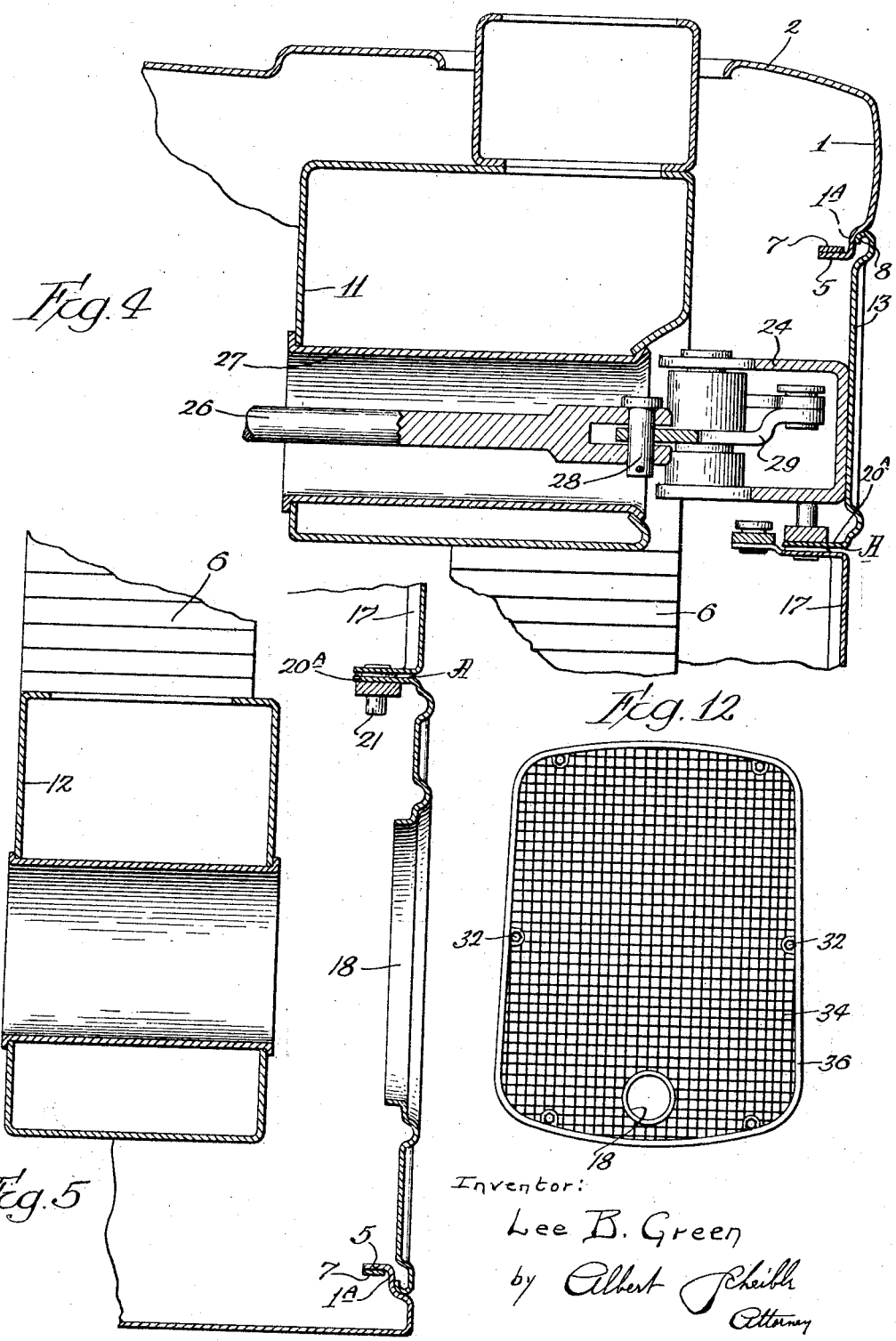

1,899,323

UNITED STATES PATENT OFFICE

LEE B. GREEN, OF LAKEWOOD, OHIO, ASSIGNOR TO THE GLOBE MACHINE & STAMPING COMPANY, OF CLEVELAND, OHIO, A CORPORATION OF OHIO

RADIATOR SHUTTER AND SHELL ASSEMBLY FOR AUTOMOBILES

Application filed July 21, 1931. Serial No. 552,119.

My invention relates to radiator-core enclosing shells for automobiles, and to frontal guard attachments for such radiator core housings; and in one of its broad aspects aims to provide a radiator shell (or shell-front) and guard assembly which will permit an expeditious attaching, or detaching of a frontal guard for the radiator core without requiring any fastenings to be made to the core or any manipulation behind or inside the shell.

In one of its general objects, my invention aims to provide a relatively simple and inexpensive radiator shell designed to present a frontal opening for admitting air to the radiator core; and also designed for the convenient and speedy attaching of a shutter or other guard directly and solely to the shell; so that the shell front will serve as the sole support for the attached shutter or other guard, and so that the shutter needed in cold weather can easily be exchanged for a grille or other guard in warm weather without requiring a detaching or even loosening of any part of the shell. Moreover, my invention aims to provide a radiator shell for this purpose which will be easily manufactured and rigid, and one which will present a finished appearance and expose no bolt perforations or the like when the guard is removed.
In a further object, my invention aims to provide a guard attachment designed to be speedily attached to and detached from, and properly centered upon, the panel front of a radiator shell by operating entirely from the front of the shell. For this purpose my invention aims to provide a radiator shell front having portions thereof interfitting the frame portions of the guard attachment and having the shell front disposed for engagement by hook members which extend only through the attachment and which hook members will permit the securing of the attachment to the shell to be effected speedily and entirely from the front of the attachment.
In still another object, my invention aims to provide a radiator shell and shutter front assembly in which the shell front can be spaced sufficiently forward from the radiator core to permit the shutters to operate between the face of the shutter front and the core, while still permitting a detaching of the entire shutter assembly when desired; and aims to secure a firm fastening of the shutter front to the shell front without requiring any fastening elements through the radiator core, or to be threaded into the core.

Moreover, my invention aims to provide a radiator-enclosure front and guard assembly which will present no unsightly gaps at the periphery of the guard, which will require no separately formed shutter frame when the guard is of a shutter type, and which will permit the guard attachment to simulate the appearance of a much larger shutter than the actual assembly of shutter blades.

Furthermore, my invention aims to provide a radiator-enclosure front and guard assembly in which one of the main members has portions thereof arranged so as to be sprung sufficiently during the attaching of the guard so as to lock the attaching means against loosening.

Still further and also more detailed objects will appear from the following specification and from the accompanying drawings, in which Fig. 1 is a front elevation of a radiator shell and shutter-type guard assembly embodying my invention, with portions broken away.

Fig. 2 is a fragmentary plan view of the same guard assembly alone, drawn on the same scale as Fig. 1.

Fig. 3 is a fragmentary horizontal section, taken along the line 3—3 of Fig. 1, and drawn on a scale larger than Figs. 1 and 2.

Fig. 4 is an enlarged vertical section taken longitudinally of the radiator core through the upper part of the radiator core and through the parts adjacent thereto, this being taken along the line 4—4 of Fig. 1.

Fig. 5 is a similarly enlarged vertical section taken along the line 5—5 of Fig. 1.

Fig. 6 is a section similar to part of Fig. 3, showing the position of a hook member during the attaching of the shutter-type guard assembly.

Figs. 7, 8 and 9 are sections similar to part of Fig. 3, showing variations of the interengaging formations on the radiator front and the frame of the guard assembly.

Fig. 10 is a perspective view of a frame portion of the guard assembly of Figs. 1, 2, 3 and 6.

Fig. 11 is a section similar to Fig. 3, showing the use of my invention in connection with a radiator enclosure in which the stationary frontal member does not extend alongside or above the radiator core.

Fig. 12 is an elevation of a grille-type guard assembly for use interchangeably with the shutter-type guard attachments of the previous figures.

Fig. 13 is an enlargement of a portion of Fig. 12.

Fig. 14 is a section taken along the line 14—14 of Fig. 13.

In accomplishing the purposes of my invention after the manner here illustrated, I provide a panel-type radiator front 1 rigidly supported on the chassis of the automobile. This front is formed of sheet metal and desirably is integral with a top flange 2 and side flanges 3, all of which flanges extend rearwardly from the front 1 after the manner customary in radiator shells, the width of these flanges depending on the forward reach of the hood portions of the car and being immaterial as far as my invention is concerned.

The shell front 1 has a (desirably narrow) portion 1A adjacent to the frontal opening 4 offset rearwardly, as shown in Figs. 3 and 6, this rearwardly offset portion preferably being of uniform width and extending entirely around the opening; and the shell front also has rearwardly directed flanges 5 along the top, bottom and both side edges of the said opening. These flanges may be quite short in proportion to the spacing between the shell front from the radiator core 6, but are preferably of uniform width, and each such flange 5 is desirably stiffened by a metal reinforcing strip 7 which bears flatwise against the outwardly directed face of the flange and is welded to the latter, as shown in Figs. 3 to 6 inclusive. Thus formed, the shell front (or so-called radiator front) presents an annular recessed part extending around and adjacent to the opening in this front, which recessed part has the forwardly facing portion 1A disposed for having a rim portion of a shutter or grille attachment bear rearwardly against it, and has the outward side portion or outward wall 1B of the annular recess disposed for engaging the periphery of such an attachment to center the latter with respect to the shell front.

To secure a firm and non-rattling bearing of the edge portion of such an attachment against the shell front, and to permit this attachment to be fastened easily from this front without reaching behind any part of the shell, I desirably employ the attachment edge formation and the simple attaching means which is shown in Figs. 1 to 6 inclusive as employed in connection with a radiator shutter attachment.

In this embodiment, the body member or shutter-framing member of the attachment, is desirably formed from a sheet metal blank of somewhat greater dimensions than the recess bordered by the rearwardly extending recess edge 1B of the radiator front, and the edge portion of this blank is recurved to present a narrow flange 8 behind a forwardly facing bead front 9 adjacent to the exposed frontal edge part of the finished attachment, the part 10 connecting the flange 8 with the bead front 9 being curved so as to fit snugly against the curved juncture of the front portions 1A and 1B as shown in Fig. 3.

The bead front 9 of the attachment desirably is of uniform width along the entire periphery of the body member of the attachment, and with the exception of the hereafter described bolt-receiving portions, the parts of this body member which are radially inward of the said bead front and adjacent to the latter are offset rearwardly to enhance the appearance of the resulting radiator front and shutter attachment assembly. The body member of the attachment has a rectangular air inlet aperture corresponding in size to the total area of the closed blades of the shutter, three edges of which opening are indicated at A in Fig. 1.

Since the air admitting core 6 usually has an upper water tank 11 above it and a lower water tank 12 below it, (as shown in Figs. 4 and 5), the upper and lower edges A of the opening in the body member or framing part of my shutter attachment desirably are approximately at the same height as the bottom of the upper and the top of the lower water tank respectively, as shown in the same figures. And since this spacing of the said aperture A from the top and bottom of the body member of my attachment leaves portions 13 and 14 of considerable height respectively above the said aperture, I desirably improve the appearance of this member by forming horizontal beads 15 and 16 respectively adjacent to the upper and lower edges of the aperture, and by embossing the metal portions between each bead and the adjacent end of the body member to simulate extensions of the shutter blades 17 of the attachment as these blades appear when closed. Thus embossed, the upper portion 13 and the lower portion 14 each form dummy shutter-extension panels. The lower dummy panel portion desirably also has a flange-bordered perforation 18 to afford access for cranking the car.

The lateral edges A of the air inlet aperture in the body member of my shutter attachment desirably are disposed near the adjacent upright edge bead 9, so as to provide a maximum width for the air inlet, thereby leaving only a narrow and inconspicuous riser strip 19 between this bead and each upright edge of the opening. In pressing the body member of the attachment, I also form a rearwardly extending flange 20 along each of the four edges of the aperture A, thereby providing two pairs of parallel stiffening flanges disposed after the manner of frame members bordering the said aperture.

When the shutter blades are to be upright, each horizontal stiffening flange 20A can be perforated for journaling the pins 21 on blade brackets 22, each of which has one end of a shutter blade 17 fastened to it, as shown in Fig. 2; and each of the upright stiffening flanges 20B can be disposed for engaging the outward edge of one of the sidemost shutter blades when the shutter is closed, as shown in Fig. 3. Hence the integral flanges on the body member of my attachment effectively form both a frame and a support for the shutter blades, so that no separately manufactured shutter frame is required.

To fasten my shutter attachment detachably to the radiator front, I provide a plurality of clamping means extending through spaced portions of the body member of my attachment adjacent to the peripheral edge of the said member, each of these clamping means being designed for engaging a rearwardly facing portion of the radiator front when tightened.

For this purpose I desirably provide the border portion of this body member with a plurality of perforations 30 (Fig. 10) through each of which the shank 31 of a hook bolt extends, these perforations preferably being symmetrically disposed—as for example, one near each end of the upper and lower border portions, and one approximately at the midheight of each of the side border portions. Each hook bolt has its hook portion adapted to hook over the adjacent rear end portion of the opening-bordering flange on the radiator front, and also over the corresponding reinforcing strip when this has been added—as shown in Fig. 3 by the hooking of the hook portion 31A over both the flange 5 and its associated reinforcing strip 7, the hook bolt being drawn forward by a frontal cap nut 32 threaded on the shank 31.

To permit the use of such hook-type fastening means without separating their parts and reassembling them, I dispose the perforations 30 so that the bolt shanks will extend close to the inward edge of the flange 5 of the radiator front. I also widen the adjacent portion of the bead front 9 at the edge of the body member of my attachment to form a boss 33 of larger radius than the cap nut 32, as shown in Figs. 3 and 10, thereby securing an adequate bearing for the said nut and also stiffening the adjacent frontal portion of my attachment to prevent the tightening of the fastening means from flexing this portion. Owing to this stiffening, the flexing strain due to a severe tightening of each nut comes on the adjacent part of the recurved edge portion of the body member of my attachment and will cause the inner flange 8 (Fig. 6) to be flexed toward the bead 9 which conceals it. Consequently, the resiliency of this recurved edge portion acts after the manner of a spring washer to prevent the tightened bolt from loosening, so that no locknuts or other auxiliary provisions are required for this purpose.

Thus arranged, my shutter attachment can be shipped and handled as a unit with the hook-bolt and nut assemblies in their proper positions, and with the bolt shanks threaded only part way into the nuts. When thus loose, each bolt is initially turned so that its bend extends parallel to the adjacent edge of the body member, thereby permitting the hook portions of all of the bolts to be inserted simultaneously through the opening in the radiator front, after the manner shown in Fig. 6. By thus disposing the bolts so that their shanks all extend close to the edges of the said opening, I also cause these bolts to aline the outer edge of my attachment substantially with the annular recess (bordered by the offsetting portion 1B), so that the border of my attachment is automatically and instantly guided to a position in which it sockets in that recess.

Each nut is next rotated a quarter turn in a direction which will swing the tip of the hook past the adjacent rearwardly directed flange on the radiator front (such as the flange 5 in Fig. 6), and when the body of the attachment is thereafter drawn slightly forward the hook portions all hook over the said flanges on the radiator front; after which a tightening of all nuts effects a firm, non-rattling and non-loosening fastening of my attachment to the said front. By reversing the procedure—namely by first loosening each nut an adequate distance, then pushing the nut and bolt against the attachment and thereafter rotating each nut and bolt a full quarter turn—my attachment can likewise be released from the radiator front and slid off the latter. Hence my simple and cheap arrangement permits an expeditious affixing and removing of the entire shutter attachment, all effected entirely from the front.

When the guard portion of my attachment is to be a grille, I border the grille fabric (which is shown in Figs. 12 and 13 as composed of relatively transverse and interwoven wires 34) with a frame formed so that it will likewise fit into, and be centered by, the opening-bordering annular recess in the radiator front, and I provide hook assemblies disposed for functioning as previously described.

For example, in Fig. 13, the woven grille fabric 34 is clinched between recurved inner webs 35 extending between the main webs of a channel-sectioned binding 36, and a wing 37 on a bolt-receiving member is also clinched between the outer face of the grille fabric and the more forward one of the said inner webs. This bolt-receiving member has a forwardly embossed and perforated portion 38 (corresponding to the boss 33 in Fig. 10) of sufficient height to present its front face forwardly of the said channel binding, thereby permitting a ready tightening of a nut 32 which bears against this front face of this boss. This nut engages the forward end of a hook bolt which has its hook portion 39A of sufficient reach to hook over the flange 5 on the radiator front, so that the fastening of the grille attachment to that front is accomplished just as with the shutter attachment.

However, while I have heretofore described desirable structural details of my radiator shell, and also of my interchangeable shutter and grille attachments, I do not wish to be limited to the particular details and arrangements thus disclosed, since many changes might be made without departing either from the spirit of my invention or from the appended claims.

For example, I do not wish to be limited to the use of an annular recess directly surrounding the opening in the shell or other radiator front for centering the attachment, as many other arrangements of relatively interengaging parts on the radiator front and on the body member (or frame) of a shutter attachment or other guard attachment will serve the same purpose.

Thus, Fig. 7 shows the radiator front as having the portion adjacent to its opening dished forwardly to present a flange 40 which faces radially outward of the said opening and over which flange a rearwardly extending flange 41 at the edge of the border portion 42 of the shutter-carrying body member will hook. Fig. 8 shows a modification for the same purpose, in which the inter-engaging portions of the radiator front and of the frame of the shutter attachment are of arcuate section, so that the assembly presents a forwardly curved bead effect such as may be preferred by some.

Fig. 9 shows still another variation, namely one in which the radiator front 43 is provided with a forwardly open groove 44 for receiving an edge bead 45 on the frame of the attachment.

Since each of the above described arrangements of inter-engaging and centering provisions can easily and cheaply be manufactured so as to insure a firm, non-rattling joint between the radiator front and the attachment, no auxiliary cushioning—such as has often been required in connection with shutter attachments applied to the fronts of the heretofore customary radiator shells—is required. So also, when a car has a radiator front with formations adapted to be engaged by correspondingly shaped formations on a guard attachment, a wide variety of such attachments can afterwards be affixed interchangeably to the same radiator front without requiring any change in the latter. Thus, the user of the car can not only exchange the initial grille attachment for a shutter attachment when winter arrives, but in the following spring can adopt a guard attachment in which the grille or other guard member is of a different design such as may correspond to the prevailing mode.

With my clamping bolts disposed so that these all extend close to the edge of the air-admitting aperture, the shank of each such bolt can bear for a considerable portion of its length against one of the rearwardly directed flanges on the radiator front, as shown in Figs. 3, 7 and 8, hence these bolt shanks alone may be adequate for nicely centering the attachment on the radiator front. Hence I do not wish to be limited to the auxiliary providing of interengaging portions on the radiator front and the attachment, although I preferably also provide such interlocking formations both for enhancing the appearance and for increasing the tightness of the joint between the radiator front and the attachment.

Moreover, since the mounting of my attachment on the radiator front is not affected by the width of the flanges 2 and 3 on the radiator shell, I do not wish to be limited to the use of my invention in connection with a radiator shell which extends sufficiently rearwardly to house the entire top and sides of the radiator core. For example, my radiator front may have only a narrow side flange 43 having its rearward portion 43A disposed for direct engagement with a hood or other housing portion 44, as indicated in Fig. 11.

When the guard member of my attachment is a shutter, a suitable shutter-actuating mechanism can also be fastened to this same single-piece body member, as for example by welding a lever-carrying fork 24 to the rear face of the upper blade-simulating panel front portion 13, as shown in Fig. 4, which work supports levers and links connecting the shutter-actuating bar 25 of Fig. 2 with a shutter-operating rod 26 extending through a tube 27 mounted in the upper water tank.

Since the shutter-actuating mechanism employed for this purpose forms no part of my present invention, I am not here describing it in detail. However, it will be obvious from Fig. 4 that the entire shutter operating mechanism, even including the actuating rod 26, can initially be assembled on the body member (or effective frame) of this attachment, and can be attached as a unit to the radiator front. Likewise, the entire shutter assembly including its operating mechanism can speedily be detached, thereby permitting speedy adjustments or repairs when needed, without also removing the radiator front after the manner heretofore required with shutters mounted to operate between the radiator front and the core.

I claim as my invention:

1. An assemblage for use in front of the radiator core of an automobile, comprising a sheet metal front member spaced forwardly from the core and having a panel opening for admitting air to the said core, and having rearwardly directed flanges extending part way toward the core along each edge of the said opening; a detachable guard member of greater area than the said opening and having portions of the guard member in rearward engagement with portions of the front member radially outward of the said opening; and releasable clamping means carried by the guard member and in hooking engagement with the said flanges.

2. An assemblage as per claim 1, including stiffening strips secured to the outward faces of the said flanges and each engaged by the clamping means conjointly with the flange to which it is secured.

3. For use forwardly of the radiator core of an automobile, a sheet metal front member of larger height and width than the said core, the said front member having a panel opening and having a rearwardly offset portion bordering the opening; a guard member of greater area than the said opening, and having its peripheral portion bearing against and approximating in contour to the said offset portion; and hook members extending through the guard member and hookingly engaging rearwardly facing portions of the said front member for clamping the guard member against the said front member, the hook members extending through the said opening and being movable into and out of engageable relation to the said front member by relatively consecutive longitudinal and rotational movements of the hook members.

4. An assemblage of a front member, a guard member, and clamping means as per claim 1, in which the front member has rearwardly extending flanges at opposite sides of its said opening; and in which the clamping means comprise hook members extending through the guard member, the hook members being bodily detachable from the front member conjointly with the guard member, each hook member having a hook portion in hooking engagement with a rearwardly facing portion of the front member; each hook member also having a shank portion closely adjacent to the inward face of one of the said flanges, whereby the said shanks will guide the guard member into alinement with the said offset portion of the front member during the attaching of the guard member.

5. For use in connection with the radiator core of an automobile, a finishing assembly suitable for use at all weather temperatures, comprising: a radiator shell; and a shutter attachment and a grille attachment interchangeably attachable to the radiator shell from the front of the said shell; the shell including a front spaced forwardly from the said core and provided with an air inlet opening, and flanges extending alongside and above the core; the shutter attachment and the grille attachment each having a peripheral portion adapted to bear rearwardly against the shell front adjacent to the opening in this front; the said two attachments having frames of counterpart shape and size, and the shell front having an annular formation adapted to engage the annular deformation on either of the said two attachments to prevent a shifting of the attachment in the general plane of the said front with respect to this front; and clamping means associated with each attachment for clamping the latter to the shell front.

6. For use in connection with the radiator core of an automobile, a finishing assembly suitable for use at all weather temperatures; comprising: a radiator shell; and a shutter attachment and a grille attachment interchangeably attachable to the radiator shell from the front of the said shell; the shell including a front having all parts thereof freely spaced forwardly from the said core, the said front being provided with an air inlet opening, and the shell including flanges extending alongside and above the core; the shutter attachment and the grille attachment each having a peripheral portion adapted to bear rearwardly against the shell front adjacent to the opening in this front; the said two attachments having their said peripheral portions of counterpart shape and size, and the shell front having an annular shoulder formation adapted to be engaged by the peripheral edge of either attachment to center the attachment with respect to the shell front; and clamping means associated with each attachment for clamping the attachment to the shell front.

7. For use in connection with the radiator core of an automobile, a finishing assembly suitable for use at all weather temperatures, comprising: a radiator shell; and a shutter attachment and a grille attachment interchangeably attachable to the radiator shell from the front of the said shell; the shell including a front spaced forwardly from the said core and provided with an air inlet opening, and flanges extending alongside and above the core; a shutter attachment and the grille attachment each having a peripheral portion adapted to bear rearwardly against the shell front adjacent to the opening in this front; the said two attachments each being of larger area than the said opening, and each including a series of attaching members disposed for extending through the said opening closely adjacent to the edge of the opening so as to center either attachment upon the said shell front.

8. A frontal finishing assembly for the radiator core of an automobile, comprising: a shell including a shell front spaced forwardly from the said core, and shell flanges extending alongside and above the core, the front being provided with an opening and having an annular flange extending rearwardly from the edge of the opening part way toward the core; a detachable member including a plate having an opening alining with the said opening in the shell front, and having its peripheral portion bearing rearwardly against the said front, and a guard supported by the said plate and extending across the opening in the plate; and plural means actuable from in front of the detachable member and extending through the opening in the shell front and hookingly engaging the rear edge of the said rearwardly extending annular flange on the shell, the said means being distributed around the said opening and each thereof being actuable by relatively consecutive longitudinal and rotational movements of a part thereof for fastening an attachment to the shell front or permitting a detaching of the attachment from the shell front.

9. In an enclosure for a radiator core, a front spaced forwardly from the core and having an opening therein; a guard attachment comprising a frame having its edge portions extending radially of the opening beyond the latter and having frame portions engaging the forward face of the said front; a guard mounted in the frame and extending across the opening in the frame; the frame having a plurality of perforations adjacent to and radially inward of the edge of opening in the said front; hook members each having its shank extending through one of the said perforations and through the opening in the said front, and having its hook portion movable by rotation of the said shank into and out of a position in which this hook portion will engage a rearwardly facing portion of the said front; and nuts each threaded on the forward end of the shank of each hook member and engaging the forward face of the frame for drawing the said shank forwardly.

10. A radiator front and guard assembly as per claim 9, in which the frame has a peripheral bead projecting forwardly from the adjacent portions of the frame, and in which the bead portions through which the bolt shanks extend are forwardly embossed.

11. A radiator front and guard assembly as per claim 9, in which the frame has a peripheral bead projecting forwardly from the adjacent portions of the frame, and in which the bead portions through which the said shanks extend are forwardly embossed and widened radially of the guard frame.

Signed at Cleveland, Ohio, July 18, 1931.

LEE B. GREEN.